United States Patent
Singh et al.

(10) Patent No.: US 10,004,008 B2
(45) Date of Patent: Jun. 19, 2018

(54) HYBRID MANAGEMENT OF HANDOVERS IN A SELF ORGANIZING NETWORK (SON)

(71) Applicant: QUALCOMM Incorporated, San Diego, CA (US)

(72) Inventors: Damanjit Singh, San Diego, CA (US); Rajat Prakash, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 41 days.

(21) Appl. No.: 14/469,082

(22) Filed: Aug. 26, 2014

(65) Prior Publication Data
US 2015/0092744 A1    Apr. 2, 2015

Related U.S. Application Data

(60) Provisional application No. 61/885,390, filed on Oct. 1, 2013.

(51) Int. Cl.
*H04W 4/00* (2018.01)
*H04W 36/00* (2009.01)
(Continued)

(52) U.S. Cl.
CPC ......... *H04W 36/0061* (2013.01); *H04L 47/29* (2013.01); *H04W 28/0284* (2013.01);
(Continued)

(58) Field of Classification Search
None
See application file for complete search history.

(56) References Cited

U.S. PATENT DOCUMENTS

2010/0002603 A1    1/2010  Gupta et al.
2010/0273487 A1   10/2010  Alonso-Rubio et al.
(Continued)

FOREIGN PATENT DOCUMENTS

WO    WO-2013/019153 A1    2/2013
WO    WO-2013/020598 A1    2/2013
(Continued)

OTHER PUBLICATIONS

International Search Report and Written Opinion—PCT/US2014/052926—ISA/EPO—Dec. 8, 2014. (13 total pages).

*Primary Examiner* — Willie J Daniel, Jr.
(74) *Attorney, Agent, or Firm* — Arent Fox, LLP and Qualcomm, Incorporated (57) ABSTRACT

The present disclosure presents a method and an apparatus for hybrid management of handovers in a self organizing network. For example, the disclosure presents a method for transmitting, via a transmitting component at the base station, handover signaling data from the base station to a network entity, wherein the base station is one of a plurality of base stations transmitting handover signaling data to the network entity, receiving, at the base station, feedback associated with one or more handover parameters of the base station, wherein the feedback is received from the network entity and includes an indication of an amount of handover signaling data generated by the base station or the plurality of base stations, and updating the one or more handover parameters based on the feedback received and local information available at the base station. As such, hybrid management of handover in a self organizing network may be achieved.

29 Claims, 6 Drawing Sheets

(51) Int. Cl.
*H04W 36/04* (2009.01)
*H04W 36/22* (2009.01)
*H04L 12/801* (2013.01)
*H04W 84/18* (2009.01)
*H04W 28/02* (2009.01)

(52) U.S. Cl.
CPC ....... *H04W 28/0289* (2013.01); *H04W 36/04* (2013.01); *H04W 36/22* (2013.01); *H04W 28/0247* (2013.01); *H04W 84/18* (2013.01)

(56) References Cited

U.S. PATENT DOCUMENTS

| | | |
|---|---|---|
| 2011/0026492 A1 | 2/2011 | Frenger et al. |
| 2012/0088507 A1 | 4/2012 | Legg et al. |
| 2013/0109389 A1 | 5/2013 | Olofsson et al. |
| 2013/0109996 A1 | 7/2013 | Sridhar et al. |
| 2013/0225182 A1 | 8/2013 | Singh et al. |
| 2015/0043386 A1* | 2/2015 | Racz .................... H04L 41/044 370/255 |

FOREIGN PATENT DOCUMENTS

| | | |
|---|---|---|
| WO | WO-2013/044512 A1 | 4/2013 |
| WO | WO-2013/124435 A1 | 8/2013 |

\* cited by examiner

HYBRID MANAGEMENT OF HANDOVERS IN A SELF ORGANIZING NETWORK (SON)

CLAIM OF PRIORITY

This application claims priority to Provisional Application No. 61/885,390 entitled "Method and Apparatus for Distributed Optimization of Handovers in a Self Organizing Network," filed Oct. 1, 2013, assigned to the assignee hereof and hereby expressly incorporated by reference herein.

BACKGROUND

The present disclosure relates generally to communication systems, and more particularly, to management of handovers in a self organizing network (SON).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

To supplement conventional base stations, additional base stations can be deployed to provide robust wireless coverage to mobile devices. For example, wireless relay stations and low power base stations (e.g., which can be commonly referred to as Home NodeBs or Home eNBs, collectively referred to as H(e)NBs, femto nodes, small cells, pico nodes, etc.) can be deployed for incremental capacity growth, enhanced user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection. Because deployment of such base stations is unplanned, low power base stations can interfere with one another where multiple stations are deployed within a close vicinity of one another.

In a small cell self organizing network (SON), a small cell has a limited (e.g., nodal) view of the network. For example, a small cell is aware of handover signaling data (or amount of handover signaling data) that is generated at the small cell and transmitted to a network entity (e.g., Mobility Management Entity (MME), SON management server, Operations, Administration, and Management (OAM) server, Home NodeB Management System (HMS), Home eNodeB Management System (HeMS), etc.). However, the small cell may not be aware of the handover signaling data generated by other small cells in the SON and transmitted to the network entity. Therefore, the small cell lacks visibility to handover signaling load of the network at a given point in time, and may not be able to efficiently manage performance of the SON.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for hybrid management of handovers at a base station in a self organizing network (SON). For example, the present disclosure presents an example method for hybrid management of handovers at a base station that may include transmitting, via a transmitting component at the base station, handover signaling data from the base station to a network entity, wherein the base station is one of a plurality of base stations transmitting handover signaling data to the network entity, receiving, at the base station, feedback associated with one or more handover parameters of the base station, wherein the feedback is received from the network entity and includes an indication of an amount of handover signaling data generated by the base station or the plurality of base stations, and updating the one or more handover parameters at the base station based on the feedback received from the network entity and local information available at the base station.

Additionally, the present disclosure presents an example apparatus for hybrid management of handovers at a base station in a self organizing network (SON) that may include means for transmitting, via a transmitting component at the base station, handover signaling data from the base station to a network entity, wherein the base station is one of a plurality of base stations transmitting handover signaling data to the network entity, means for receiving, at the base station, feedback associated with one or more handover parameters of the base station, wherein the feedback is received from the network entity and includes an indication of an amount of handover signaling data generated by the base station or the plurality of base stations, and means for updating the one or more handover parameters at the base station based on the feedback received and local information available at the base station.

In a further aspect, the present disclosure presents an example apparatus for hybrid management of handovers at a base station in a self organizing network (SON) that may include a handover signaling data transmitting component to transmit handover signaling data from the base station to a network entity, wherein the base station is one of a plurality of base stations transmitting handover signaling data to the network entity, a feedback receiving component to receive, at the base station, feedback associated with one or more handover parameters of the base station, wherein the feedback is received from the network entity and includes an indication of an amount of handover signaling data generated by the base station or the plurality of base stations, and a handover parameter updating component to update the one or more handover parameters at the base station based on the feedback received and local information available at the base station.

Moreover, in an aspect, the presents disclosure presents an example non-transitory computer readable medium for hybrid management of handovers at a base station in a self organizing network (SON) comprising code that, when executed by a processor or processing system included within the UE, causes the UE to transmit, via a transmitting component at the base station, handover signaling data from the base station to a network entity, wherein the base station is one of a plurality of base stations transmitting handover signaling data to the network entity, receive, at the base station, feedback associated with one or more handover parameters of the base station, wherein the feedback is received from the network entity and includes an indication of an amount of handover signaling data generated by the base station or the plurality of base stations, and update the one or more handover parameters at the base station based on the feedback received and local information available at the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method and an apparatus for hybrid management of handovers at a base station in a self organizing network (SON). A SON may be generally defined, for example, as an automation mechanism designed to make planning, configuration, management, optimization and healing of mobile radio access networks simpler and faster. For example, the example method may include updating one or more handover parameters at a base station of a SON based on feedback received at the base station and local information available at the base station. A handover parameter may be generally defined as a parameter at a base station that affects the performance of handovers at the base station. The feedback received at the base station can include an indication of an amount of handover signaling data generated by the base station or multiple base stations.

Figure 1:
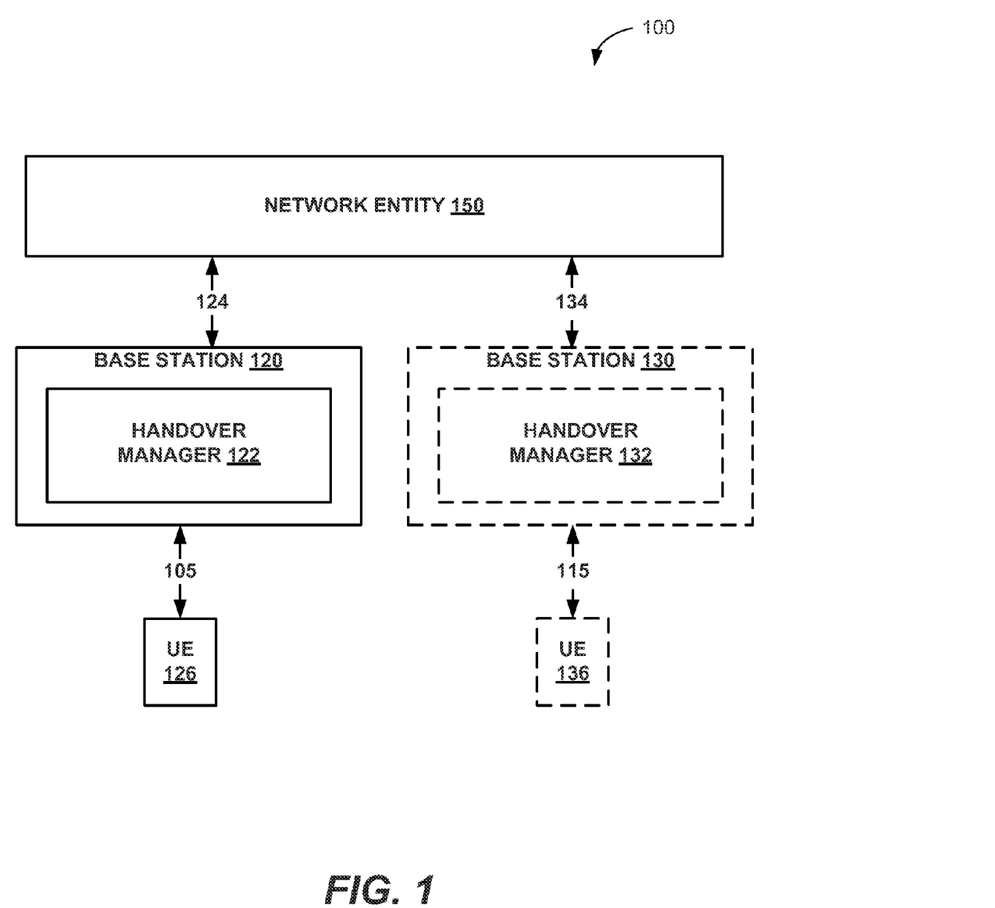
FIG. 1 is a block diagram illustrating an example wireless system in aspects of the present disclosure.

Referring to FIG. 1, a wireless communication system 100 is illustrated that facilitates hybrid or distributed management of handovers at a base station in a self organizing network (SON). In an aspect, for example, system 100 may be a self organizing network that may include base stations 120 and/or 130 for providing an over-the-air service to UEs 126 and/or 136 respectively. Further, base station 120 may communicate with network entity 150 over the link 124 and/or base station 130 may communicate with network entity 150 over the link 134, respectively. Various functions may be enabled via links 124 and/or 134 such as, for example, configuring, monitoring, managing, and/or provisioning of services for UEs 126 and/or 136.

In an aspect, network entity 150 may include, but may not be limited to, an access point, a base station (BS) or Node B or eNodeB, a macro cell, a small cell (e.g., a femtocell, or a pico cell), a relay, a peer-to-peer device, an authentication, authorization and accounting (AAA) server, a mobile switching center (MSC), Mobility Management Entity (MME), SON management server, OAM server, Home NodeB Management System (HMS), Home eNodeB Management System (HeMS), etc. Additionally, network entity 150 may include any number of suitable types of network components that can enable base stations 120 and/or 130 to communicate and/or establish and maintain links 124 and 134 with network entity 150. In an example aspect, base stations 120 and/or 130 may operate according to Time Division Synchronous Code Division Multiple Access (TD-SCDMA), Long Term Evolution (LTE) or Global System for Mobile Communications (GSM) standard as defined in 3GPP Specifications.

In an additional aspect, UEs 126, 136 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

For example, when base stations (e.g., base stations 120, 130) in a SON generate high amounts of handover signaling data and transmit the generated handover signaling data to a network entity (e.g., network entity 150), the network entity may get overloaded or may detect an overload condition in the network. In response to an overloaded condition, if the network entity sends a message (e.g., broadcast message) to the base stations in the SON to reduce the amount of handover signaling data generated at the base stations, each or at least some of the base stations may reduce the amount of handover signaling data generated at the respective base station (for example, by updating their one or more handover parameters) and thereby address the overload condition of the network entity 150. However, the amount by which a base station may decide to reduce the amount of handover signaling data generated by the base station may depend on the local information available at that base station. For example, the local information may include an amount of handover signaling data generated at the base station, a handover rate at the base station, a number of users served at the base station, mobility performance of user equipments (UEs) served by the base station, radio link failures at the base station, velocity of UEs served by the base station, and a transmit power of the base station.

Consequently, a mechanism where base stations can react to a network overload condition by reducing handover signaling data generated by the base stations themselves is desired. In the absence of such a mechanism, various entities in a network (for example, network entity 150) may have to be scaled to handle higher amount of handover signaling data, which may result in underutilization of resources, for example, at the network entity. Therefore, a mechanism is needed to manage the handover signaling data generated at the base stations and/or the network entity while addressing the utilization of the resources.

In an aspect, base station 120 may include a handover manager 122 (and/or base station 130 may include a handover manager 132) for hybrid management of handovers at a base station in a self organizing network (SON) by transmitting, via a transmitting component at the base station, handover signaling data from the base station to a network entity, wherein the base station is one of multiple base stations transmitting handover signaling data to the network entity, receiving feedback, from the network entity, where the feedback received at the base station includes an indication of an amount of handover signaling data generated by the base station or the plurality of base stations, and updating the one or more handover parameters at the base station based on the feedback received from the network entity and local information available at the base station.

Figure 2:
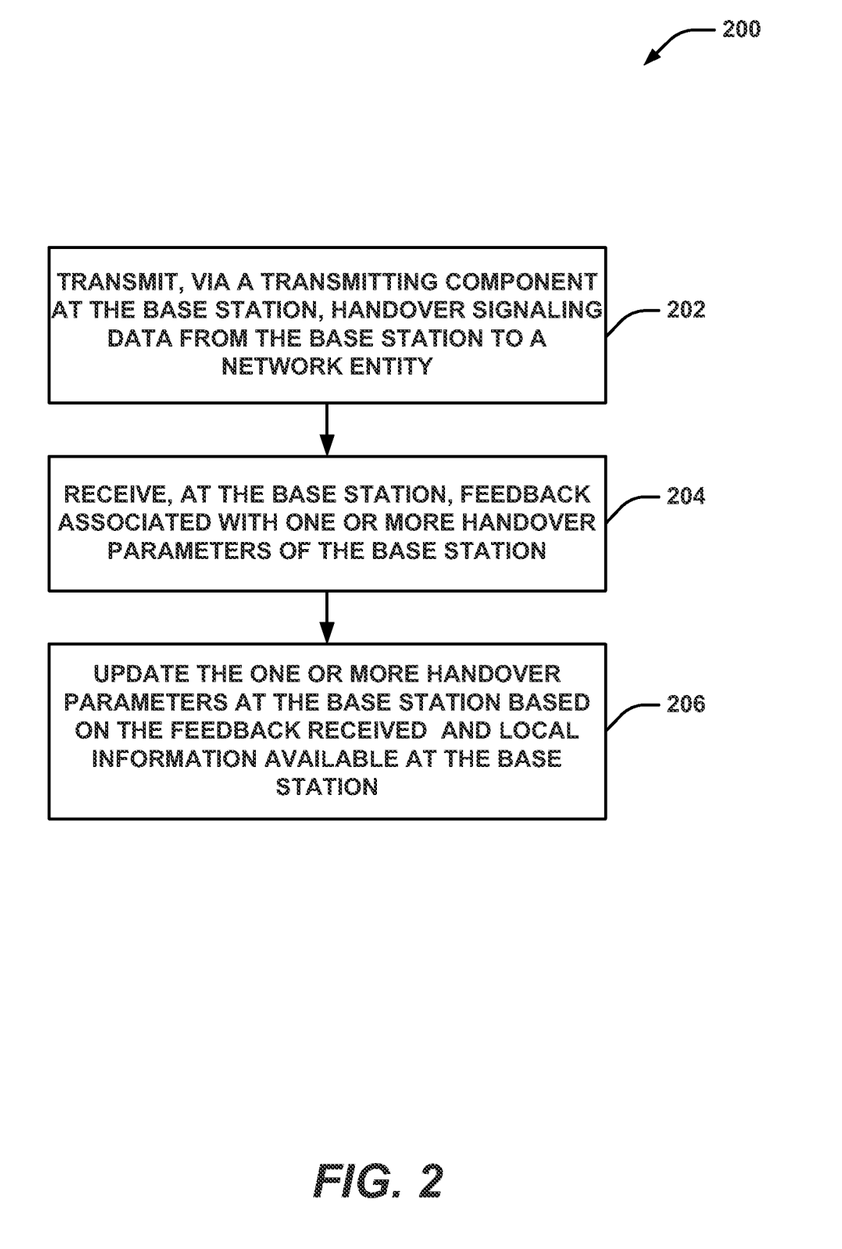
FIG. 2 is a flow diagram illustrating aspects of an example method in aspects of the present disclosure.

FIG. 2 illustrates an example methodology 200 for hybrid management of handovers at a base station in a SON.

In an aspect, at block 202, methodology 200 may include transmitting handover signaling data from the base station to a network entity. For example, in an aspect, base station 120 and/or handover manager 122 may include a specially programmed processor module, or a processor executing specially programmed code stored in a memory, to transmit handover signaling data from base station 120 to network entity 150.

In an aspect, base stations 120 and/or 130 may generate handover signaling data at the base station and transmit the generated handover signaling data to network entity 150. For example, in an aspect, network entity 150 may be a mobile management entity (MME). As used herein, a MME is generally responsible for idle mode user equipment (UE) paging and tagging procedure including retransmissions. The MME may also be involved in bearer activation/deactivation process, choosing a serving gateway (SGW) for a UE at the initial attach and at time of intra-LTE handover involving core network (CN) node relocation, and/or in authenticating a user.

For example, handover signaling data may be generated at base station 120 when a UE, e.g., UE 126 camps on base station 120 or when base station 120 is involved in a handover (e.g., when UE 126 moves from base station 120 to base station 130 or when UE 136 moves from base station 130 to base station 120). In an aspect, base station 120 may transmit handover signaling data in the form of a report (e.g., operations measurement (OM) data) on a continuous/ongoing basis or at periodic intervals. In an additional or optional aspect, the amount of handover signaling data generated by base station 120 may be based on, e.g., number of UEs served by base station 120, number of handovers being performed by base station 120, etc.

As network entity 150 may receive handover signaling data from a plurality of base stations (e.g., base station 120 and/or 130) connected to network entity 150, network entity 150 may develop a system level view of the handover signaling data that is different from a nodal level view of handover signaling data available at each of the base stations. For example, base station 120 may have a nodal level view of handover signaling data of base station 120 based on the handover signaling information generated at base station 120. However, base station 120 may not have a system level view of the handover signaling data as base station 120 may not have access/view of the handover signaling data generated at/by other base stations (e.g., base station 130) in the SON.

In an additional aspect, handover signaling data at a base station may be determined based on at least one or more procedures occurring at the base station. For example, in an aspect, handover signaling data at base station 120 may be determined based at least on one or more of a handover preparation procedure, a handover resource allocation procedure, a handover notification procedure, a path switch request procedure, a handover cancel procedure, and a serial number (SN) status transfer procedure. These procedures are generally defined in TS 36.413 and/or TS 36.423 of 3GPP Specifications.

In an aspect, at block 204, methodology 200 may include receiving, at the base station, feedback associated with one or more handover parameters of the base station. For example, in an aspect, base station 120 and/or handover manager 122 may include a specially programmed processor module, or a processor executing specially programmed code stored in a memory, to receive at base station 120 feedback associated with one or more handover parameters of base station 120.

For example, as described above, base stations 120 and/or 130 may transmit handover signaling data generated by base stations 120 and/or 130 to network entity 150, and the network entity can develop (or build) a system level view of handover signaling data based on the handover signaling data received from the base stations. In an aspect, when one or more base stations (e.g., 120 and/or 130) connected to network entity 150 generate high amounts of handover signaling data and transmit the generated handover signaling data to network entity 150, network entity 150 may get overloaded. For example, in an aspect, if the handover signaling data received from the base stations in the SON at network entity 150 is above a given capacity (e.g., above a threshold value that may be configured by an operator of the SON), it may affect the performance of the SON such as components of the SON including, for example, network entity 150, base stations 120 and/or 130, and/or UEs connected to base stations 120 and/or 130.

For example, in an aspect, network entity 150 may monitor the handover signaling data received from the base stations in the SON and may provide feedback to some or all of the base stations indicating whether one or more base stations in the SON have to reduce the amount of the handover signaling data generated at a base station (for example, if the amount of handover signaling data generated at a particular base station is above the first threshold value) and/or whether one or more base stations may increase the amount of the handover signaling data generated at a base station (for example, if the amount of handover signaling data generated at a particular base station is below the first threshold value).

For example, in an aspect, handover signaling data that may be allowed (e.g., or desired) to be generated at a base station (e.g., base station 120) may be calculated at network entity 150 based on capacity of the network entity 150 (e.g., capacity of MME) divided by the number of base stations in the SON supported by network entity 150. For example, if the capacity (e.g., signaling load capacity) of network entity 150 is "X" and "N" is number of base stations supported by network entity 150, a threshold value (e.g., a first threshold value) for handover signaling data that may be generated by each base station in the SON is "X/N." However, if the handover signaling data generated by a base station (e.g., base station 120) is higher than the threshold value (e.g., first threshold value), the base station may be considered to be in an over loaded condition. In an additional or optional aspect, if the handover signaling load generated by a base station (e.g., base station 120) is lower than the threshold value (e.g., first threshold value), the base station may be considered to be in an under loaded condition. In an aspect, some base stations of the SON may be generating handover signaling data at a rate higher than the threshold value and/or some base stations may be generating handover signaling data at a rate lower than the threshold value.

In an additional or optional aspect, a base station may be allowed to generate signaling load above the threshold value of X/N (e.g., first threshold value), if one or more other base stations are generating handover signaling data at a rate that is lower than the first threshold value.

In an additional aspect, base station 120 and/or handover manager 122 may receive an indication on whether network entity 150 is receiving handover signaling data (e.g., from the base stations in the SON) at a rate that is higher or lower than a threshold value (e.g., second threshold value), wherein the threshold value is calculated at the network entity based at least on a capacity of the network entity. For example, in an aspect, base station 120 and/or handover manager 122 may receive an indication from network entity 150 indicating whether network entity 150 is receiving handover signaling data from the base stations in the SON (e.g., cumulative handover signaling data) at a rate which is higher or lower than the capacity (e.g., handover signaling capacity) of network entity 150. This information may be used by base station 120 for modifying one or more handover related parameters at the base station.

In an aspect, at block 206, methodology 200 may include updating the one or more handover related parameters at the base station based on the feedback received and local information available at the base station. For example, in an aspect, base station 120 and/or handover manager 122 may include a specially programmed processor module, or a processor executing specially programmed code stored in a memory, to update the one or more handover related parameters at base station 120 based on the feedback received and local information available at base station 120.

In an aspect, base station 120 and/or handover manager 122 may update the one or more handover related parameters to increase or decrease the handover signaling data generated at the base station based on the feedback received from the network entity. For example, in an aspect, handover manager 122 may decrease the handover signaling data generated at base station 120 if base station 120 and/or handover manager 122 receives indication from network entity 150 that the base station is generating handover signaling data at a rate which is higher than the first threshold value and/or that network entity 150 is receiving handover signaling data at a rate which is higher than a second threshold value. In these scenarios, the base station can update the one or more parameters at the base station based on either or both the indications received at the base station (e.g., as a hybrid handover management mechanism). For example, in an aspect, the base station may service a UE (e.g., UE 126) for longer than normal to reduce the amount of handover signaling data generated at the base station (e.g., base station 120).

In an additional aspect, base station 120 and/or handover manager 122 may update the one or more handover parameters at base station 120 based on additional local information available at the base station. For example, the local information available at the base station may include handover signaling data generated at the base station, handover rate at the base station, number of users served at the base station, mobility performance of user equipments (UE) served by the base station, radio link failures at the base station, and velocity of UEs served by the base station.

In an additional aspect, base station 120 and/or handover manager 122 may update one or more of a hysteresis parameter, a time-to-trigger (TTT) parameter, a filter coefficient, an event offset parameter, a cell individual offset (CIO) parameter, a reporting range parameter, and a frequency offset parameter based on the feedback received from the network entity and local information available at the base station. For example, in an aspect, base station 120 and/or handover manager 122 may update one or more of hysteresis parameter, time-to-trigger (TTT) parameter, filter coefficient, an event offset parameter, cell individual offset (CIO) parameter, a reporting range parameter, and frequency offset parameter at base station 120 based on feedback received from network entity 150 and local information available at base station 120 (e.g., base station 120 is generating handover signaling data at a rate above the first threshold value and network entity is receiving handover signaling data above the second threshold value). These parameters are generally defined in TS 36.331 and 25.331 of 3GPP Specifications. For example, base station may increase TTT parameter to keep UE 126 on base station 120 longer to reduce the handover signaling data at the base station.

In an additional or optional aspect, base station 120 and/or handover manager 122 may initiate a handover from a first base station on a first layer to a second base station on a second layer to handover a UE that is generating handover signaling data at a rate higher than a threshold value (e.g., third threshold value) on the first layer. For example, in an aspect, base station 120 and/or handover manager 122 may initiate a handover from base station 120 (e.g., base station 120 may be a small cell) to base station 130 (e.g., base station 130 may be a macro cell) when base station 130 generates handover signaling data at a rate that is higher than the handover signaling data rate allowed for the first layer (e.g., small cell layer). In a further additional aspect, base station 120 and/or handover manager 122 may initiate a handover from base station 120 (e.g., with frequency "F1") to base station 120 (e.g., with "F2") when base station 120 generates handover signaling data at a rate that is higher than the handover signaling data rate allowed for base station 120. In an additional aspect, handover from first layer to the second layer may be triggered based on an indication from the network entity and generation of handover signaling data above the third threshold value at the base station.

As described above, hybrid management of handovers at a base station in a SON may be achieved.

Figure 3:
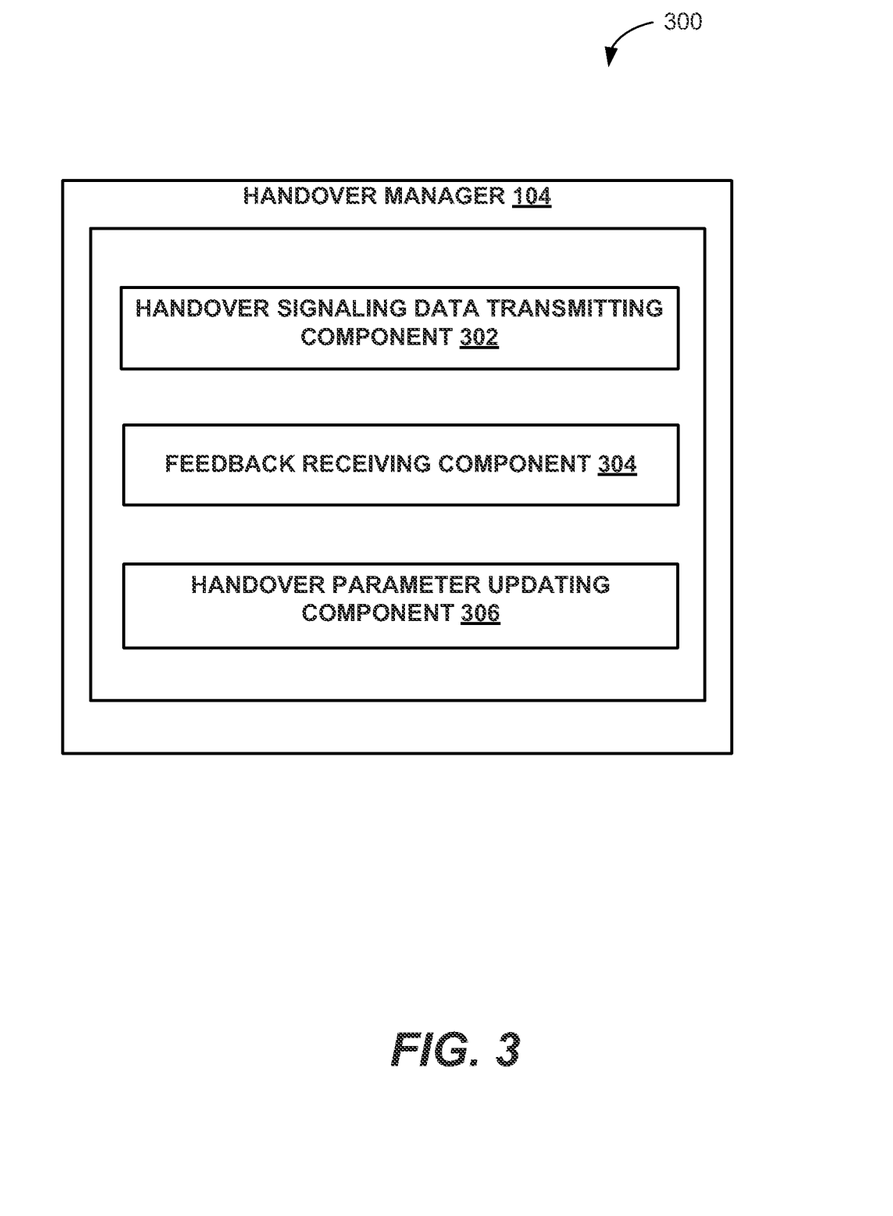
FIG. 3 is a block diagram illustrating an example handover manager in aspects of the present disclosure.

Referring to FIG. 3, illustrated are a handover manager 122 and various sub-components for hybrid management of handover at a base station. In an example aspect, handover manager 122 may be configured to include the specially programmed processor module, or the processor executing specially programmed code stored in a memory, in the form of a handover signaling data transmitting component 302, a feedback receiving component 304, and/or a handover parameter updating component 306. In an aspect, a component may be one of the parts that make up a system, may be hardware or software, and may be divided into other components.

In an aspect, handover manager 122 and/or handover signaling data transmitting component 302 may be configured to transmit, via a transmitting component at the base station, handover signaling data from the base station to a network entity. For example, in an aspect, handover signaling data transmitting component 302 may be configured to transmit handover signaling data from base station 120 to network entity 150. In an additional aspect, base station 120 may be one of a plurality of base stations that are transmitting handover signaling data to network entity 150.

In an aspect, handover manager 122 and/or feedback receiving component 304 may be configured to receiving feedback, from the network entity, associated with one or more handover parameters of the base station. For example, in an aspect, feedback receiving component 304 may be configured to receive feedback from network entity 150. In an additional aspect, the feedback received at base station 120 can include an indication of an amount of handover signaling data generated by the base station (e.g., 120) or the plurality of base stations (e.g., 120 and 130).

In an aspect, handover manager 122 and/or handover parameter updating component 306 may be configured to update the one or more handover parameters at the base station based on the feedback received from the network entity and local information available at the base station. For example, in an aspect, handover parameter updating component 306 may be configured to update the one or more handover parameters at base station 120 based on the feedback received from network entity 150 and local information available at base station 150.

Figure 4:
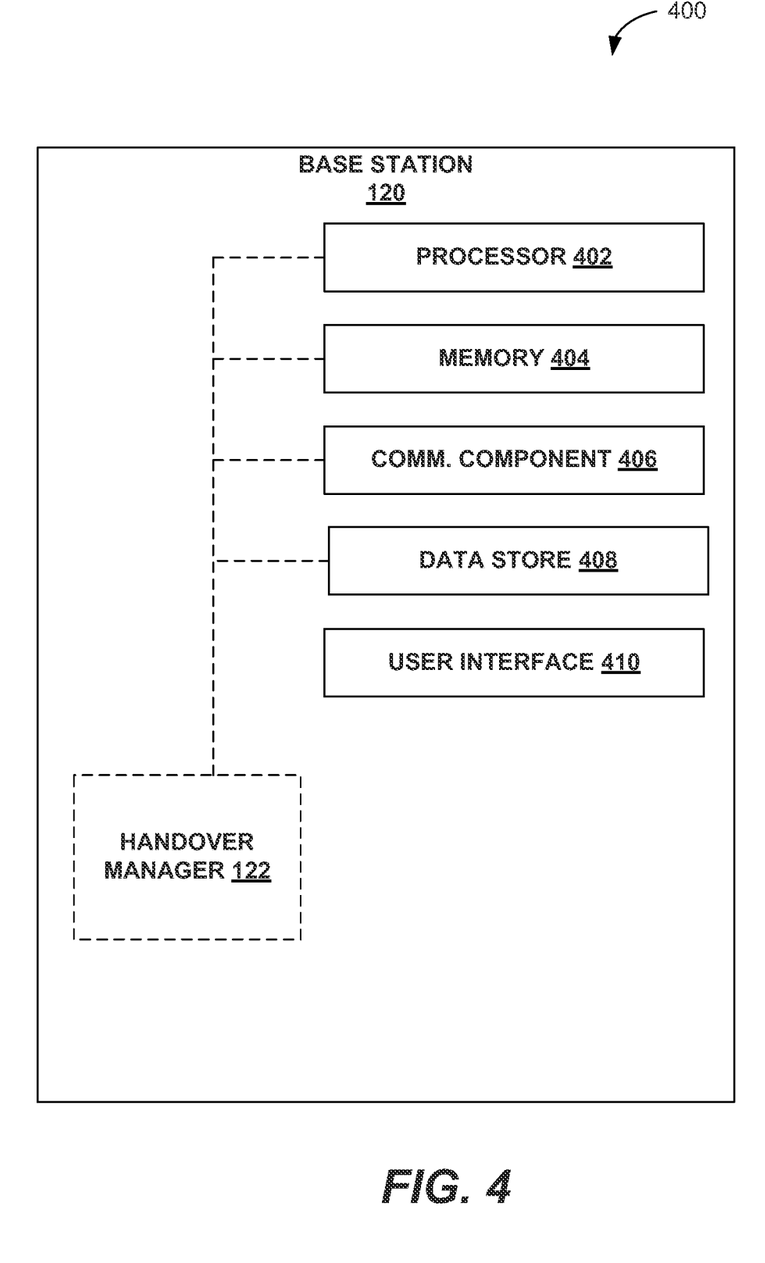
FIG. 4 is a block diagram illustrating aspects of a computer device according to the present disclosure.

Referring to FIG. 4, in an aspect, base station 120, for example, including handover manager 122 may be or may include a specially programmed or configured computer device. In one aspect of implementation, base station 120 may include handover manager 104 and its sub-components, including a handover signaling data transmitting component 302, a feedback receiving component 304, and/or a handover parameter updating component 306 (FIG. 3), such as in specially programmed computer readable instructions or code, firmware, hardware, or some combination thereof.

In an aspect, for example as represented by the dashed lines, handover manager 122 may be implemented or executed using one or any combination of processor 402, memory 404, communications component 406, and data store 408. For example, handover manager 122 may be defined or otherwise programmed as one or more processor modules of processor 402. Further, for example, handover manager 122 may be defined as a computer-readable medium stored in memory 404 and/or data store 408 and executed by processor 402. Moreover, for example, inputs and outputs relating to operations of handover manager 122 may be provided or supported by communications component 406, which may provide a bus between the components of computer device 400 or an interface to communication with external devices or components.

Base station 120 may include a processor 402 specially configured to carry out processing functions associated with one or more of components and functions described herein. Processor 402 can include a single or multiple set of processors or multi-core processors. Moreover, processor 402 can be implemented as an integrated processing system and/or a distributed processing system.

Base station 120 further includes a memory 404, such as for storing data used herein and/or local versions of applications and/or instructions or code being executed by processor 402, such as to perform the respective functions of the respective entities described herein. Memory 404 can include any type of memory usable by a computer, such as random access memory (RAM), read only memory (ROM), tapes, magnetic discs, optical discs, volatile memory, non-volatile memory, and any combination thereof.

Further, Base station 120 includes a communications component 406 that provides for establishing and maintaining communications with one or more parties utilizing hardware, software, and services as described herein. Communications component 406 may carry communications between components on Base station 120, as well as between user and external devices, such as devices located across a communications network and/or devices serially or locally connected to Base station 120. For example, communications component 406 may include one or more buses, and may further include transmit chain components and receive chain components associated with a transmitter and receiver, respectively, or a transceiver, operable for interfacing with external devices.

Additionally, Base station 120 may further include a data store 408, which can be any suitable combination of hardware and/or software, that provides for mass storage of information, databases, and programs employed in connection with aspects described herein. For example, data store 408 may be a data repository for applications not currently being executed by processor 402.

Base station 120 may additionally include a user interface component 410 operable to receive inputs from a user of Base station 120, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 5:
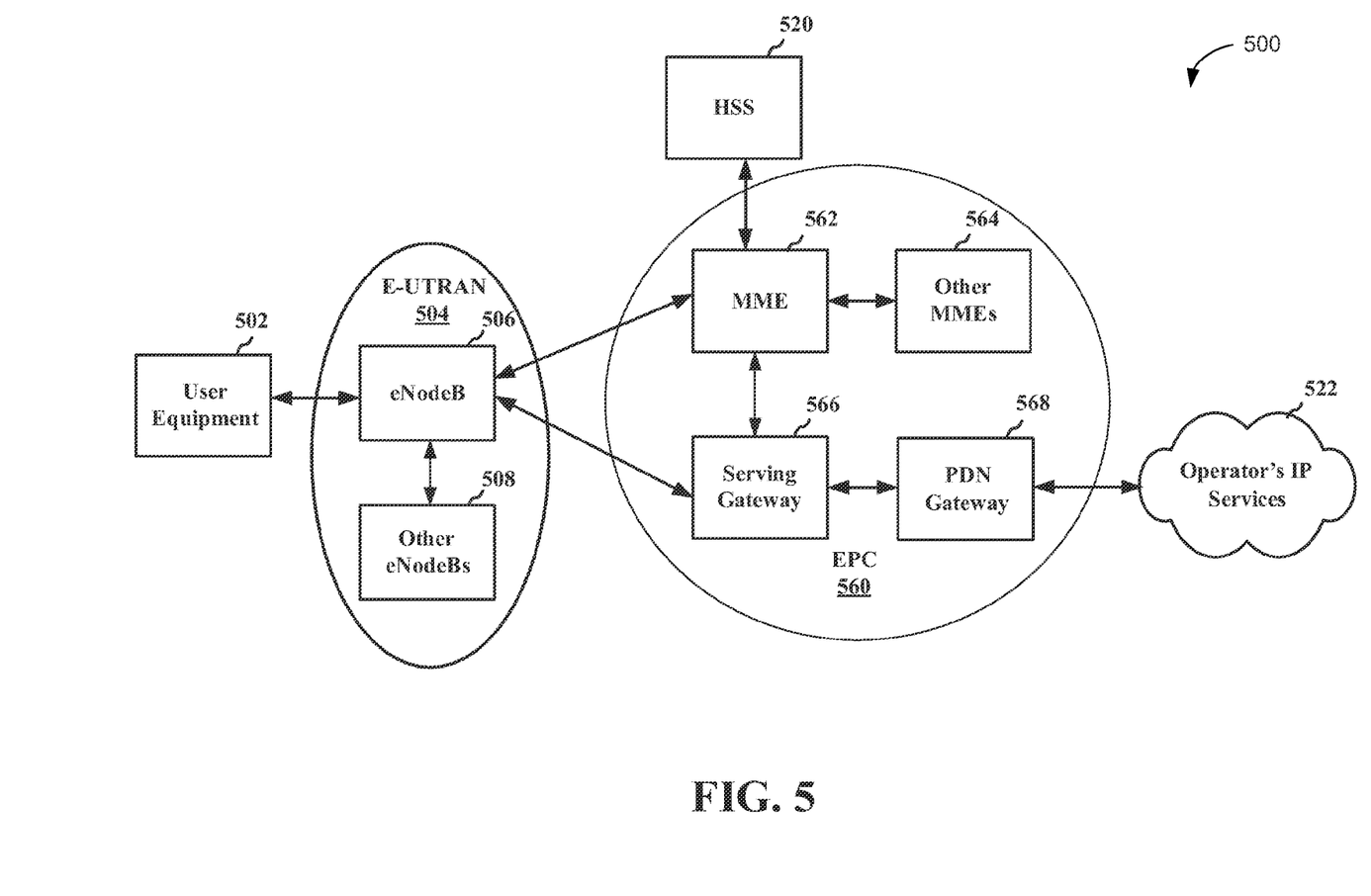
FIG. 5 is a block diagram conceptually illustrating an example of a telecommunications system.

FIG. 5 is a diagram illustrating a long term evolution (LTE) network architecture 500 employing various apparatuses of wireless communication system 100 (FIG. 1) and may include one or more base stations (e.g., base stations 120 and/or 130) configured to include a handover manager 122 (FIG. 1). The LTE network architecture 500 may be referred to as an Evolved Packet System (EPS) 500. EPS 500 may include one or more user equipment (UE) 502 (e.g., UEs 126 and/or 136), an Evolved UMTS Terrestrial Radio Access Network (E-UTRAN) 504, an Evolved Packet Core (EPC) 560, a Home Subscriber Server (HSS) 520, and an Operator's IP Services 522. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508. The eNB 506 provides user and control plane protocol terminations toward the UE 502. The eNB 506 may be connected to the other eNBs 508 via an X2 interface (i.e., backhaul). The eNB 506 may also be referred to by those skilled in the art as a base station, a base transceiver station, a radio base station, a radio transceiver, a transceiver function, a basic service set (BSS), an extended service set (ESS), or some other suitable terminology. The eNB 506 provides an access point to the EPC 560 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an SI interface to the EPC 560. The EPC 560 includes a Mobility Management Entity (MME) 562, other MMEs 564, a Serving Gateway 566, and a Packet Data Network (PDN) Gateway 568. The MME 562 is the control node that processes the signaling between the UE 502 and the EPC 510. Generally, the MME 512 provides bearer and connection management. All user IP packets are transferred through the Serving Gateway 566, which itself is connected to the PDN Gateway 568. The PDN Gateway 568 provides UE IP address allocation as well as other functions. The PDN Gateway 568 is connected to the Operator's IP Services 522. The Operator's IP Services 522 include the Internet, the Intranet, an IP Multimedia Subsystem (IMS), and a PS Streaming Service (PSS).

Figure 6:
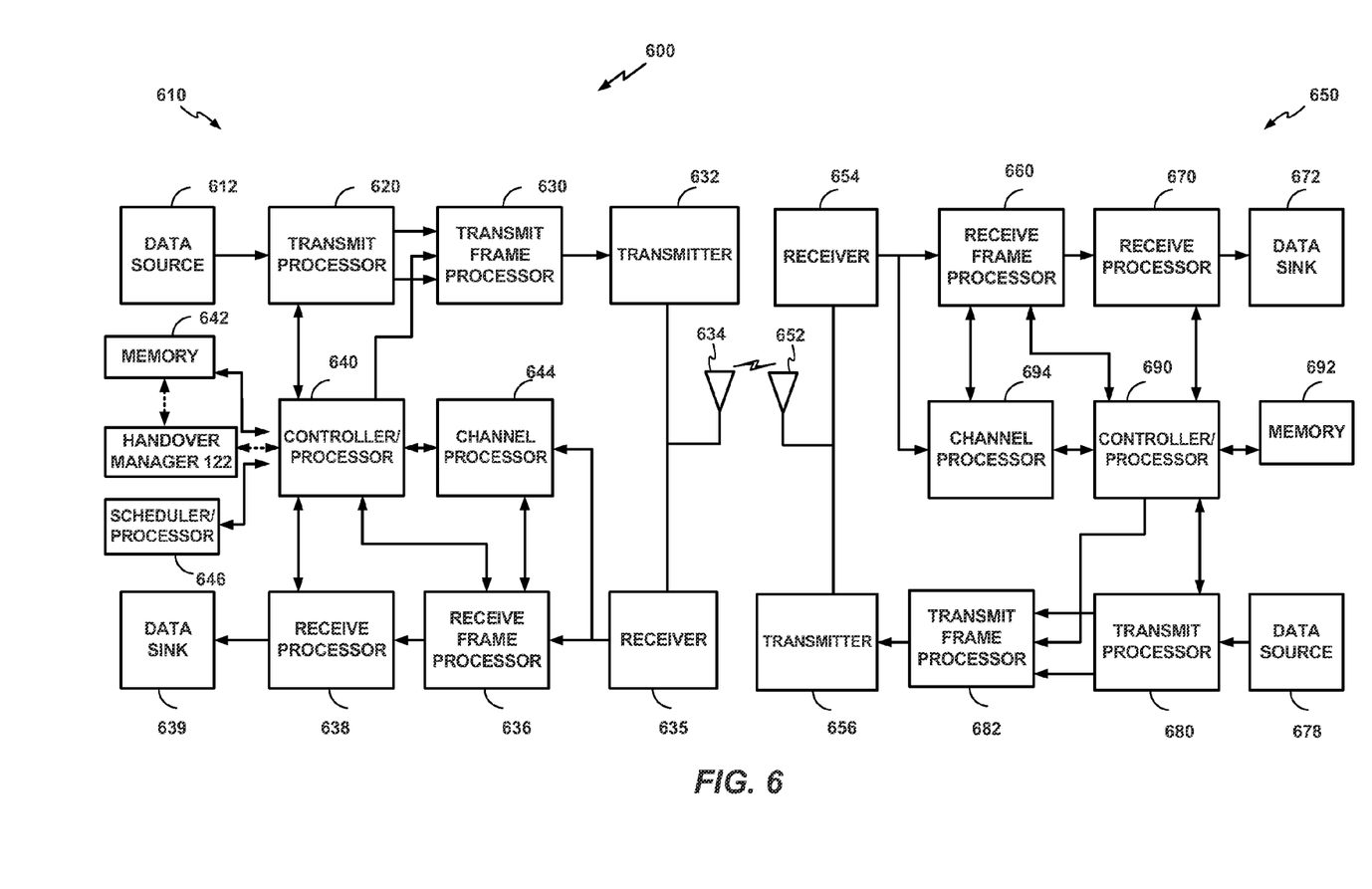
FIG. 6 is a block diagram conceptually illustrating an example of a NodeB in communication with a UE in a telecommunications system.

FIG. 6 is a block diagram of a NodeB 610 in communication with a UE 650, where the UE 650 may be the same as or similar to UE 126 and/or 136 of FIG. 1, and where the NodeB 610 may be the same as or similar to base station 120 and/or 130 of FIG. 1, in that it is configured to include handover manager 122 (FIG. 1), for hybrid management of handovers, in controller/processor 690 and/or memory 692. In the downlink communication, a transmit processor 620 may receive data from a data source 612 and control signals from a controller/processor 640. The transmit processor 620 provides various signal processing functions for the data and control signals, as well as reference signals (e.g., pilot signals). For example, the transmit processor 620 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 644 may be used by a controller/processor 640 to determine the coding, modulation, spreading, and/or scrambling schemes for the transmit processor 620. These channel estimates may be derived from a reference signal transmitted by the UE 650 or from feedback from the UE 650. The symbols generated by the transmit processor 620 are provided to a transmit frame processor 630 to create a frame structure. The transmit frame processor 630 creates this frame structure by multiplexing the symbols with information from the controller/processor 640, resulting in a series of frames. The frames are then provided to a transmitter 632, which provides various signal conditioning functions including amplifying, filtering, and modulating the frames onto a carrier for downlink transmission over the wireless medium through antenna 634. The antenna 634 may include one or more antennas, for example, including beam steering bidirectional adaptive antenna arrays or other similar beam technologies.

At the UE 650, a receiver 654 receives the downlink transmission through an antenna 652 and processes the transmission to recover the information modulated onto the carrier. The information recovered by the receiver 654 is provided to a receive frame processor 660, which parses each frame, and provides information from the frames to a channel processor 694 and the data, control, and reference signals to a receive processor 670. The receive processor 670 then performs the inverse of the processing performed by the transmit processor 620 in the NodeB 610. More specifically, the receive processor 670 descrambles and de-spreads the symbols, and then determines the most likely signal constellation points transmitted by the NodeB 610 based on the modulation scheme. These soft decisions may be based on channel estimates computed by the channel processor 694. The soft decisions are then decoded and de-interleaved to recover the data, control, and reference signals. The CRC codes are then checked to determine whether the frames were successfully decoded. The data carried by the successfully decoded frames will then be provided to a data sink 672, which represents applications running in the UE 650 and/or various user interfaces (e.g., display). Control signals carried by successfully decoded frames will be provided to a controller/processor 690. When frames are unsuccessfully decoded by the receive processor 670, the controller/processor 690 may also use an acknowledgement (ACK) and/or negative acknowledgement (NACK) protocol to support retransmission requests for those frames.

In the uplink, data from a data source 678 and control signals from the controller/processor 690 are provided to a transmit processor 680. The data source 678 may represent applications running in the UE 650 and various user interfaces (e.g., keyboard). Similar to the functionality described in connection with the downlink transmission by the NodeB 610, the transmit processor 680 provides various signal processing functions including CRC codes, coding and interleaving to facilitate FEC, mapping to signal constellations, spreading with OVSFs, and scrambling to produce a series of symbols. Channel estimates, derived by the channel processor 694 from a reference signal transmitted by the NodeB 610 or from feedback contained in the midamble transmitted by the NodeB 610, may be used to select the appropriate coding, modulation, spreading, and/or scrambling schemes. The symbols produced by the transmit processor 680 will be provided to a transmit frame processor 682 to create a frame structure. The transmit frame processor 682 creates this frame structure by multiplexing the symbols with information from the controller/processor 690, resulting in a series of frames. The frames are then provided to a transmitter 656, which provides various signal conditioning functions including amplification, filtering, and modulating the frames onto a carrier for uplink transmission over the wireless medium through the antenna 652.

The uplink transmission is processed at the NodeB 610 in a manner similar to that described in connection with the receiver function at the UE 650. A receiver 635 receives the uplink transmission through the antenna 634 and processes the transmission to recover the information modulated onto the carrier. The information recovered by the receiver 635 is provided to a receive frame processor 636, which parses each frame, and provides information from the frames to the channel processor 644 and the data, control, and reference signals to a receive processor 638. The receive processor 638 performs the inverse of the processing performed by the transmit processor 680 in the UE 650. The data and control signals carried by the successfully decoded frames may then be provided to a data sink 639 and the controller/processor, respectively. If some of the frames were unsuccessfully decoded by the receive processor, the controller/processor 640 may also use an acknowledgement (ACK) and/or negative acknowledgement (NACK) protocol to support retransmission requests for those frames.

The controller/processors 640 and 690 may be used to direct the operation at the NodeB 610 and the UE 650, respectively. For example, the controller/processors 640 and 690 may provide various functions including timing, peripheral interfaces, voltage regulation, power management, and other control functions. The computer readable media of memories 642 and 692 may store data and software for the NodeB 610 and the UE 650, respectively. A scheduler/processor 646 at the NodeB 610 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for hybrid management of handovers at a base station in a self organizing network (SON), comprising:
   transmitting, via a transmitting component at the base station, handover signaling data from the base station to a network entity, wherein the base station is one of a plurality of base stations transmitting handover signaling data to the network entity, and wherein the network entity is a mobility management entity or a serving gateway (SGW);
   receiving, at the base station, feedback associated with one or more handover parameters of the base station, wherein the feedback includes a first indication and a second indication, the first indication indicating whether the network entity is receiving cumulative handover signaling data from the plurality of base stations at a first rate which is higher or lower than a cumulative handover signaling capacity value of the network entity, and the second indication indicating whether the base station is generating the handover signaling data at a second rate which is higher or lower than a per-base station handover signaling capacity value of the network entity that is calculated at least in part based on a signaling load capacity of the network entity and a number of base stations in the SON supported by the network entity; and
   updating the one or more handover parameters at the base station based on the feedback received and local information available at the base station.

2. The method of claim 1, wherein the local information available at the base station is based on at least one of an amount of handover signaling data generated at the base station, a handover rate at the base station, a number of users served at the base station, mobility performance of user equipments (UEs) served by the base station, radio link failures at the base station, velocity of UEs served by the base station, a transmit power of the base station, and combinations thereof.

3. The method of claim 1, further comprising:
   determining the local information available at the base station.

4. The method of claim 1, wherein the updating of the one or more handover parameters at the base station comprises:
   updating at least one of a hysteresis parameter, a time-to-trigger (TTT) parameter, a filter coefficient, an event offset parameter, a cell individual offset (CIO) parameter, a reporting range parameter, a frequency offset parameter at the base station, and combinations thereof.

5. The method of claim 1, further comprising:
   determining the handover signaling data at the base station based on at least one of a handover preparation procedure, a handover resource allocation procedure, a handover notification procedure, a path switch request procedure, a handover cancel procedure, a serial number (SN) status transfer procedure, and combinations thereof.

6. The method of claim 1, wherein the updating of the one or more handover parameters at the base station comprises:
   initiating a handover from a first base station on a first layer to a second base station on a second layer to migrate a user equipment (UE) that is generating signaling at a third rate higher than a layer threshold value on the first layer, wherein the layer threshold value is determined at the base station.

7. The method of claim 6, wherein the first and the second base stations are different types of base stations or configured with different frequencies.

8. The method of claim 1, further comprising:
   reducing or increasing an amount of the handover signaling data transmitted from the base station to the network entity in response to the updating of the one or more handover parameters based on the feedback.

9. The method of claim 1, wherein the first indication indicates the first rate is lower than the cumulative handover signaling capacity value of the network entity, and the second indication indicates that the second rate is higher than the per-base station handover signaling capacity value of the network entity, and further comprising:
   reducing an amount of the handover signaling data from the base station to the network entity in response to the updating of the one or more handover parameters.

10. The method of claim 1, wherein the first indication indicates the first rate is higher than the cumulative handover signaling capacity value of the network entity, and the second indication indicates that the second rate is lower than the per-base station handover signaling capacity value of the network entity, and further comprising:
    reducing an amount of the handover signaling data from the base station to the network entity in response to the updating of the one or more handover parameters.

11. The method of claim 1, wherein the first indication indicates the first rate is higher than the cumulative handover signaling capacity value of the network entity, and the second indication indicates that the second rate is higher than the per-base station handover signaling capacity value of the network entity, and further comprising:
    reducing an amount of the handover signaling data from the base station to the network entity in response to the updating of the one or more handover parameters.

12. The method of claim 1, wherein the first indication indicates the first rate is lower than the cumulative handover signaling capacity value of the network entity, and the second indication indicates that the second rate is lower than the per-base station handover signaling capacity value of the network entity, and further comprising:
    increasing an amount of the handover signaling data from the base station to the network entity in response to the updating of the one or more handover parameters.

13. The method of claim 1, wherein the second indication indicates that the second rate is higher than the per-base station handover signaling capacity value of the network entity, and further comprising:
    allowing an amount of the handover signaling data from the base station to the network entity to be at the second rate in response to the first rate and based on the updating of the one or more handover parameters.

14. An apparatus for hybrid management of handovers at a base station in a self organizing network (SON), comprising:
    means for transmitting, via a transmitting component at the base station, handover signaling data from the base station to a network entity, wherein the base station is one of a plurality of base stations transmitting handover signaling data to the network entity, and wherein the network entity is a mobility management entity or a serving gateway (SGW);

means for receiving, at the base station, feedback associated with one or more handover parameters of the base station, wherein the feedback includes a first indication and a second indication, the first indication indicating whether the network entity is receiving cumulative handover signaling data from the plurality of base stations at a first rate which is higher or lower than a cumulative handover signaling capacity value of the network entity, and the second indication indicating whether the base station is generating the handover signaling data at a second rate which is higher or lower than a per-base station handover signaling capacity value of the network entity that is calculated at least in part based on a signaling load capacity of the network entity and a number of base stations in the SON supported by the network entity; and means for updating the one or more handover parameters at the base station based on the feedback received and local information available at the base station.

15. The apparatus of claim 14, wherein the local information available at the base station is based on at least one of an amount of handover signaling data generated at the base station, a handover rate at the base station, a number of users served at the base station, a mobility performance of user equipments (UEs) served by the base station, radio link failures at the base station, velocity of UEs served by the base station, a transmit power of the base station, and combinations thereof.

16. The apparatus of claim 14, wherein means for updating the one or more handover parameters at the base station comprises:

means for updating at least one of a hysteresis parameter, a time-to-trigger (TTT) parameter, a filter coefficient, an event offset parameter, a cell individual offset (CIO) parameter, a reporting range parameter, a frequency offset parameter at the base station, and combinations thereof.

17. The apparatus of claim 14, further comprising:

means for determining the handover signaling data at the base station based on at least one of a handover preparation procedure, a handover resource allocation procedure, a handover notification procedure, a path switch request procedure, a handover cancel procedure, a serial number (SN) status transfer procedure, and combinations thereof.

18. The apparatus of claim 14, further comprising:

means for initiating a handover from a first base station on a first layer to a second base station on a second layer to migrate a user equipment (UE) that is generating signaling at a third rate higher than a layer threshold value on the first layer, wherein the layer threshold value is determined at the base station.

19. An apparatus for hybrid management of handovers at a base station in a self organizing network (SON), comprising:

a handover signaling data transmitting component to transmit handover signaling data from the base station to a network entity, wherein the base station is one of a plurality of base stations transmitting handover signaling data to the network entity, and wherein the network entity is a mobility management entity or a serving gateway (SGW);

a feedback receiving component to receive, at the base station, feedback associated with one or more handover parameters of the base station, wherein the feedback associated with one or more handover parameters of the base station, wherein the feedback includes a first indication and a second indication, the first indication indicating whether the network entity is receiving cumulative handover signaling data from the plurality of base stations at a first rate which is higher or lower than a cumulative handover signaling capacity value of the network entity, and the second indication indicating whether the base station is generating the handover signaling data at a second rate which is higher or lower than a per-base station handover signaling capacity value of the network entity that is calculated at least in part based on a signaling load capacity of the network entity and a number of base stations in the SON supported by the network entity; and a handover parameter updating component to update the one or more handover parameters at the base station based on the feedback received and local information available at the base station.

20. The apparatus of claim 19, wherein the handover parameter updating component is further configured to update the one or more handover parameters at the base station based on at least one of an amount of handover signaling data generated at the base station, a handover rate at the base station, a number of users served at the base station, mobility performance of user equipments (UEs) served by the base station, radio link failures at the base station, velocity of UEs served by the base station, a transmit power of the base station, and combinations thereof.

21. The apparatus of claim 19, wherein the handover parameter updating component is further configured to update at least one of a hysteresis parameter, a time-to-trigger (TTT) parameter, a filter coefficient, an event offset parameter, a cell individual offset (CIO) parameter, a reporting range parameter, a frequency offset parameter at the base station, and combinations thereof.

22. The apparatus of claim 19, further comprising:

a handover signaling data determining component to determine the handover signaling data at the base station based at least on one of a handover preparation procedure, a handover resource allocation procedure, a handover notification procedure, a path switch request procedure, a handover cancel procedure, a serial number (SN) status transfer procedure, and combinations thereof.

23. The apparatus of claim 19, further comprising:

a handover initiating component to initiate a handover from a first base station to a second base station, wherein the base station are different types of base stations or configured with different frequencies.

24. A non-transitory computer readable medium storing computer executable code for hybrid management of handovers at a base station in a self organizing network (SON), comprising:

code for transmitting, via a transmitting component at the base station, handover signaling data from the base station to a network entity, wherein the base station is one of a plurality of base stations transmitting handover signaling data to the network entity, and wherein the network entity is a mobility management entity or a serving gateway (SGW);

code for receiving, at the base station, feedback associated with one or more handover parameters of the base station, wherein the feedback includes a first indication and a second indication, the first indication indicating whether the network entity is receiving cumulative handover signaling data from the plurality of base stations at a first rate which is higher or lower than a cumulative handover signaling capacity value of the network entity, and the second indication indicating whether the base station is generating the handover signaling data at a second rate which is higher or lower than a per-base station handover signaling capacity value of the network entity that is calculated at least in part based on a signaling load capacity of the network entity and a number of base stations in the SON supported by the network entity; and code for updating the one or more handover parameters at the base station based on the feedback received and local information available at the base station.

25. The computer readable medium of claim 24, wherein the local information available at the base station is based on at least one of an amount of handover signaling data generated at the base station, a handover rate at the base station, a number of users served at the base station, a mobility performance of user equipments (UEs) served by the base station, radio link failures at the base station, velocity of UEs served by the base station, a transmit power of the base station, and combinations thereof.

26. The computer readable medium of claim 24, wherein the code for updating of the one or more handover parameters at the base station includes:

code for updating at least one of a hysteresis parameter, a time-to-trigger (TTT) parameter, a filter coefficient, an event offset parameter, a cell individual offset (CIO) parameter, a reporting range parameter, a frequency offset parameter at the base station, and combinations thereof.

27. The computer readable medium of claim 24, further comprising:

code for determining the handover signaling data at the base station based at least on one of a handover preparation procedure, a handover resource allocation procedure, a handover notification procedure, a path switch request procedure, a handover cancel procedure, a serial number (SN) status transfer procedure, and combinations thereof.

28. The computer readable medium of claim 24, further comprising:

code for initiating a handover from a first base station on a first layer to a second base station on a second layer to migrate a user equipment (UE) that is generating signaling at a third rate higher than a layer threshold value on the first layer, wherein the layer threshold value is determined at the base station.

29. The computer readable medium of claim 24, wherein the first and the second base stations are different types of base stations or configured with different frequencies.

* * * * *